United States Patent [19]

Senak, Jr.

[11] Patent Number: 5,424,624
[45] Date of Patent: Jun. 13, 1995

[54] DRIVER CIRCUIT FOR ELECTRIC ACTUATOR

[75] Inventor: Peter Senak, Jr., Bristol, Conn.

[73] Assignee: Dana Corporation, Toledo, Ohio

[21] Appl. No.: 14,761

[22] Filed: Feb. 8, 1993

[51] Int. Cl.$^6$ .............................................. H02P 7/05
[52] U.S. Cl. .................................. 318/701; 318/254; 318/492
[58] Field of Search ............... 318/138, 139, 254, 376, 318/439, 685, 696, 701, 492, 512

[56] References Cited

U.S. PATENT DOCUMENTS

| | | |
|---|---|---|
| 4,049,998 | 9/1977 | Boxer . |
| 4,295,083 | 10/1981 | Leenhouts ........................ 318/696 |
| 4,330,742 | 5/1982 | Reimers ........................ 318/139 X |
| 4,348,619 | 9/1982 | Ray et al. . |
| 4,360,770 | 11/1982 | Ray et al. . |
| 4,459,519 | 7/1984 | Erdman . |
| 4,563,619 | 1/1986 | Davis et al. . |
| 4,684,867 | 8/1987 | Miller et al. . |
| 4,698,562 | 10/1987 | Gale et al. . |
| 4,720,662 | 1/1988 | Lanser ........................ 318/138 |
| 5,041,768 | 8/1991 | Herrmann ........................ 318/138 |
| 5,075,610 | 12/1991 | Harris ........................ 318/701 |

*Primary Examiner*—Bentsu Ro
*Attorney, Agent, or Firm*—MacMillan, Sobanski & Todd

[57] ABSTRACT

A driver circuit for an electric actuator having one or more phase windings which are selectively connected to a source of electrical energy is disclosed. Magnetic energy stored in the phase windings is transferred to a capacitor to prevent damage. The driver circuit includes a recovery circuit for transferring this energy from the capacitor back to the source of electrical energy. The recovery circuit includes an electronic recovery switch which is selectively opened and closed by a duty cycle controller logic circuit. When the recovery circuit switch is closed, electrical current flows from the capacitor to an inductor. The inductor returns this energy to the source of electrical energy. The recovery circuit further includes a power supply for the logic components of the duty cycle controller. The power supply receives operating power from the unused energy stored in the windings of the actuator driver circuit and uses the same ground node as the duty cycle controller logic circuit and the recovery circuit switch. Also, the recovery circuit includes a pair of auxiliary power source terminals which permit it to re-charge the source of electrical energy even though none of the phase windings are energized.

28 Claims, 2 Drawing Sheets

DRIVER CIRCUIT FOR ELECTRIC ACTUATOR

BACKGROUND OF THE INVENTION

This invention relates in general to driver circuits for electric actuators, such as rotary motors and linear actuators, and in particular to an improved structure for highly efficient, low cost driver circuit for such an electric actuator.

Electric actuators are well known devices which convert electrical energy to mechanical movement. To accomplish this, electric actuators establish and control electromagnetic fields so as to cause the desired mechanical motion. There are many different types of electric actuators, each utilizing different means for establishing and controlling these electromagnetic fields. One well known type of electric actuator is a rotary motor, in which the electrical energy is converted into rotational movement of a mechanical member. Another well known type of electric actuator is a linear actuator, in which the electrical energy is converted into linear movement of a mechanical member.

The two basic components of an electric rotary motor are (1) a stationary member, generally referred to as the stator, and (2) a rotatable member, generally referred to as the rotor. Typically, the rotor is supported for rotation within the stator. A plurality of radially inwardly extending poles are provided on the stator, while a plurality of radially outwardly extending poles are provided on the rotor. Depending upon the particular variety of electric motor, windings of an electrical conductor are provided on the poles of either the stator or the rotor, or on both. By generating pulses of electrical current through the windings in a proper manner, electromagnetic fields are created which interact with the stator and the rotor. These electromagnetic fields cause the rotor to rotate relative to the stator.

Similarly, the two basic components of an electric linear actuator are (1) a stationary member, generally embodied as an electromagnetic coil, and (2) a linearly movable member, generally referred to as the armature. Typically, the armature is supported for linear movement within the electromagnetic coil. By generating pulses of electrical current through the electromagnetic coil, electromagnetic fields are created which cause the armature to move linearly relative to the electromagnetic coil.

In both types of electric actuators, an external driver circuit is usually provided for generating the pulses of electrical current in a desired manner. Such driver circuits are typically connected between a source of electrical energy and the electric actuator. To generate a pulse of electric current, the driver circuit closes an electronic switch which allows electrical current to flow from the source of electrical energy to the electric actuator. The energy contained in this pulse of electrical current is converted into an electromagnetic field by the windings of the rotary motor or the coil of the linear actuator. A portion of that energy is then converted into mechanical energy so as to cause movement of the movable member of the electric actuator. When the electronic switch is subsequently opened, a portion of the energy contained in the winding or the coil remains stored therein as a continuing electromagnetic field.

Many different actuator driver circuits are known in the art. Some actuator driver circuits do not include any means for recovering the portion of the stored energy contained in the electromagnetic field when the electronic switch is opened. Consequently, actuator driver circuits of this type are inefficient. Other actuator driver circuits do include some means for recovering the portion of the stored energy contained in the electromagnetic field when the electronic switch is opened. However, it has been found that these types of actuator driver circuits are relatively complicated and expensive in construction. Also, it has been found that such actuator driver circuits are not readily adaptable for use with varying types of electric actuators. Accordingly, it would be desirable to provide an improved structure for an actuator driver circuit which is relatively high in efficiency, relatively low in cost, and readily adaptable for use with varying types of electric actuators.

SUMMARY OF THE INVENTION

This invention relates to an improved structure for a driver circuit adapted for use with an electric actuator, such as a rotary motor or a linear actuator. In the illustrated rotary motor environment, the circuit includes one or more phase windings which are selectively connected to a source of electrical energy by means of electronic phase switches. When the electronic phase switches are closed, electrical current flows from the source of electrical energy through the associated phase windings, resulting in movement of the actuator. When the electronic phase switches are opened, the flow of electrical current through the associated phase windings decreases. However, magnetic energy stored in the phase windings is transferred to a capacitor to prevent damage to the electronic phase switches.

The actuator driver circuit further includes a recovery circuit for transferring this energy from the capacitor back to the source of electrical energy. The recovery circuit includes an electronic recovery switch which is selectively opened and closed by a duty cycle controller logic circuit. When the recovery circuit switch is closed, electrical current flows from the capacitor to an inductor. When the recovery circuit switch is opened, no electrical current flows to the inductor. The inductor, in turn, returns this energy to the source of electrical energy. The recovery circuit further includes a power supply for the logic components of the duty cycle controller. The power supply receives operating power from the unused energy stored in the windings of the actuator driver circuit and uses the same ground node as the duty cycle controller logic circuit and the recovery circuit switch. Also, the recovery circuit includes a pair of auxiliary power source terminals which permit it to re-charge the source of electrical energy even though none of the phase windings are energized.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
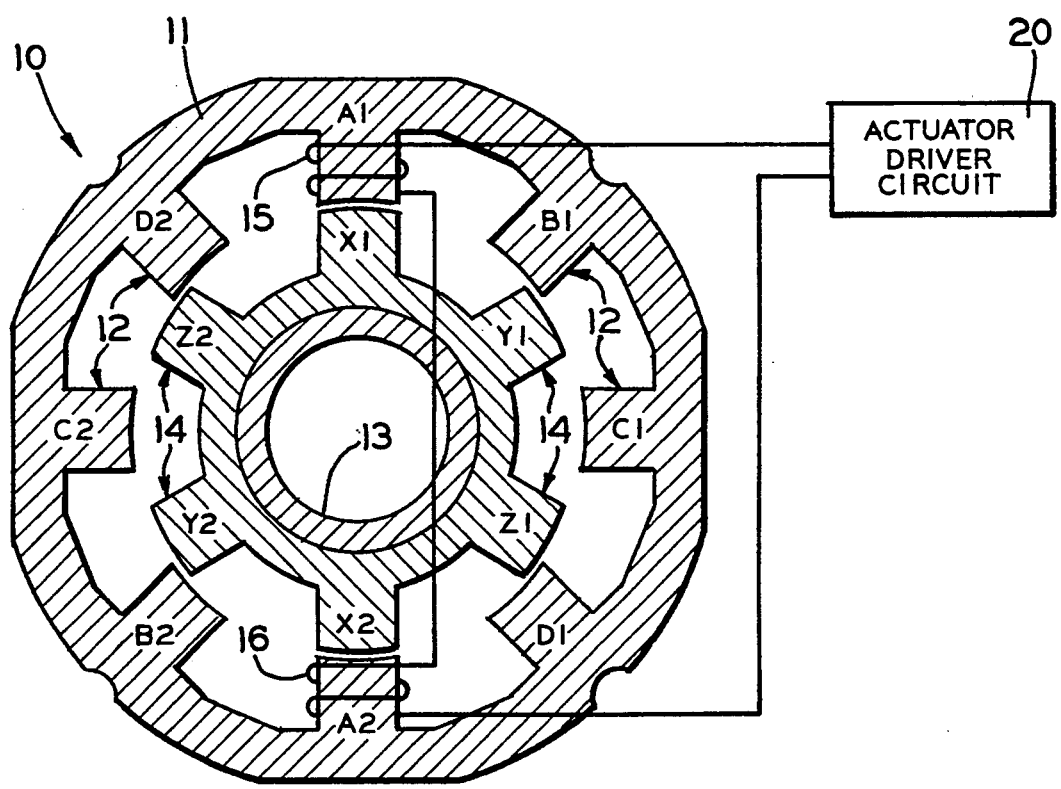
FIG. 1 is a schematic sectional elevational view of a conventional variable reluctance motor including an improved actuator driver circuit in accordance with this invention.

Referring now to the drawings, there is schematically illustrated in FIG. 1 a portion of a conventional variable reluctance electric motor, indicated generally at 10. For the sake of convenience, this invention will be described and illustrated in the context of the illustrated variable reluctance motor 10. However, it will be appreciated that this invention may be used in conjunction with other types of rotary motors, such as hybrid motors, brushless and brush type DC motors, and the like. Also, it will be appreciated that this invention may be used in conjunction with linear actuators, such as solenoids, and is not limited to rotary motors.

The motor 10 includes a stator 11 which is generally hollow and cylindrical in shape. A plurality of radially inwardly extending poles, indicated generally at 12, are formed on the stator 11 and extend longitudinally throughout the length thereof. The stator poles 12 are preferably provided in opposed pairs, such as shown at A1 and A2, B1 and B2, C1 and C2, and D1 and D2. Thus, eight stator poles 12 are provided on the illustrated stator 11. However, a greater or lesser number of stator poles 12 may by provided.

Each of the stator poles 12 is generally rectangular in cross sectional shape. The radially innermost surfaces of the stator poles 12 are slightly curved so as to define an inner diameter. The stator 11 and the stator poles 12 are formed from a magnetically permeable material, such as iron. As will be explained below, each of the stator pole pairs A1 and A2, B1 and B2, C1 and C2, and D1 and D2 represents one phase for energizing the variable reluctance motor 10 for operation.

A cylindrical rotor 13 is co-axially supported within the stator 11 for relative rotational movement. The rotor 13 has a plurality of radially outwardly extending poles, indicated generally at 14, formed thereon. As with the stator poles 12, the rotor poles 14 extend longitudinally throughout the length of the rotor 13 and are preferably provided in opposed pairs, such as shown at X1 and X2, Y1 and Y2, and Z1 and Z2. Thus, six rotor poles 14 are provided on the illustrated rotor 13. However, a greater or lesser number of rotor poles 14 may by provided. Generally, the number of rotor poles 14 is different from the number of stator poles 12.

Each of the rotor poles 14 is generally rectangular in cross sectional shape. The radially outermost surfaces of the rotor poles 14 are slightly curved so as to define an outer diameter. The outer diameter defined by the rotor poles 14 is preferably only slightly smaller than the inner diameter defined by the stator poles 12. Thus, the radial gap defined between the stator poles 12 and the rotor poles 14 when they are aligned is relatively small. The rotor 13 and the rotor poles 14 are also formed from a magnetically permeable material, such as iron.

An electrical conductor is wound about each of the stator poles 12. As schematically shown in FIG. 1, a first pair of pole windings 15 and 16 are provided on the opposed stator poles A1 and A2, respectively. Second, third, and fourth pairs of pole windings (not shown) are similarly provided on the other stator pole pairs B1 and B2, C1 and C2, D1 and D2. The pole windings 15 and 16 are connected to an actuator driver circuit 20, the structure and operation of which will be described in detail below. The pole windings 15 and 16 may be connected in series, as illustrated in FIG. 1, or in parallel.

The pole windings provided on the other stator pole pairs B1 and B2, C1 and C2, and D1 and D2 are also connected to the actuator driver circuit 20.

When electrical current is supplied to the pole windings 15 and 16 by the actuator driver circuit 20, both the stator 11 and the rotor 13 become magnetized. The pole windings 15 and 16 are oppositely wound such that stator pole A1 (upon which the pole winding 15 is disposed) is energized to become a magnetic north pole, while the stator pole A2 (upon which the pole winding 16 is disposed) is energized become a magnetic south pole. Consequently, a magnetic circuit is created between these opposed stator poles A1 and A2. As a result, magnetic flux (lines of force) are created between the north stator pole A1 and the south stator pole A2. The magnetic flux passes from the north stator pole A1 through the nearest rotor pole X1, through the body of the rotor 13, and from the opposed rotor pole X2 to the south stator pole A2. The magnetic circuit between the north and south stator poles A1 and A2 is completed through the outer annular portion of the stator 11.

The resistance to the passage of magnetic flux from the north stator pole A1 to the nearest rotor pole X1 (and similarly from the south stator pole A2 to the nearest rotor pole X2) is referred to as reluctance, as discussed above. The magnitude of this reluctance changes with the rotational position of the rotor poles 14 relative to the stator poles 12. Reluctance is at a minimum when the rotor poles 14 are radially aligned with the stator poles 12, as with A1, X1 and A2, X2 in FIG. 1. Consequently, the generation of the magnetic circuit described above produces a torque which tends to align the opposed rotor poles X1 and X2 with the energized opposed stator poles A1 and A2, as shown in FIG. 1.

To effect rotation of the rotor 13 relative to the stator 11, the first pair of pole windings 15 and 16 on the stator poles A1 and A2 is turned off, and the second pair of pole windings on the stator poles B1 and B2 is turned on. As a result, B1 is energized to become a magnetic north pole, and B2 is energized to become a magnetic south pole. Such energization attracts the nearest rotor poles Y1 and Y2 to become aligned with the energized stator poles B1 and B2. Consequently, the rotor 13 is rotated relative to the stator 11. To continue such rotation of the rotor 13, the stator poles B1 and B2 are de-energized, and the stator poles C1 and C2 are energized. Thus, the rotor poles Z1 and Z2 are attracted to the stator poles C1 and C2. By sequentially energizing the stator poles 12 in this manner, the rotor poles 14 are sequentially attracted thereto. As a result, the rotor 13 rotates relative to the stator 11 in a direction (counterclockwise in the illustrated embodiment) which is opposite to the direction (clockwise in the illustrated embodiment) in which the stator pole pairs A1 and A2, B1 and B2, C1 and C2, and D1 and D2 are energized.

In the illustrated embodiment, the stator 11 is provided with eight stator poles 12, while the rotor 13 is provided with six rotor poles 14. From the above discussion, it can be seen that each time one of the stator pole pairs A1 and A2, B1 and B2, C1 and C2, and D1 and D2 is energized, the rotor 13 will be rotated fifteen degrees relative to the stator 11. Thus, the stator pole pairs A1 and A2, B1 and B2, C1 and C2, and D1 and D2 must be energized in sequence six times in order to rotate the rotor 13 throughout one complete revolution. Because the rotational speed of the rotor 13 is directly related to the frequency of the current pulses supplied to the stator poles 12, the motor 10 operates as a synchronous motor. By varying the number of stator poles 12 and rotor poles 14, the rotational speed of the rotor 12 can be varied with respect to the frequency of the current pulses supplied to the stator 11. The structure and operation of the variable reluctance motor 10 thus far described is conventional in the art and forms no part of this invention.

Figure 2:
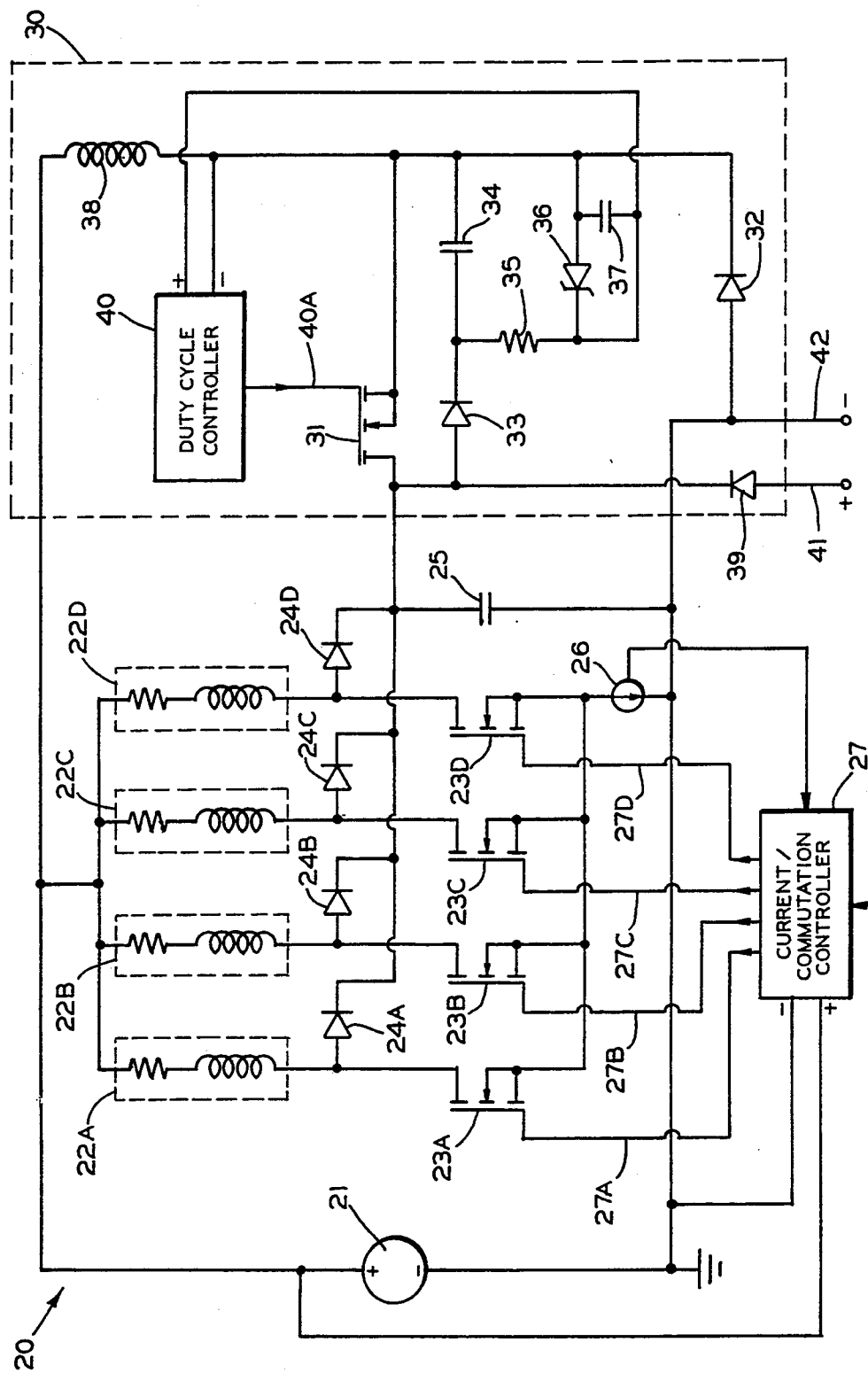
FIG. 2 is a schematic diagram of the actuator driver circuit illustrated in FIG. 1.

Referring now to FIG. 2, there is illustrated a schematic diagram of the actuator driver circuit 20 illustrated in FIG. 1. The actuator driver circuit 20 is connected to a source of electrical energy 21 which, in the illustrated embodiment, may be a rechargeable source of direct current electrical energy, such as a battery. The negative terminal of the source of electrical energy 21 is connected to ground potential.

The positive terminal of the source of electrical energy 21 is connected to the junction of four motor phase windings 22A, 22B, 22C, and 22D. The first motor phase winding 22A represents the combination of the individual pole windings 15 and 16 provided on the stator pole pairs A1 and A2. Similarly, the motor phase windings 22B, 22C, and 22D represent the combination of the individual pole windings respectively provided on the stator pole pairs B1 and B2, C1 and C2, and D1 and D2. As shown in FIG. 2, each of the motor phase windings 22A, 22B, 22C, and 22D is composed of an equivalent series combination of resistance and inductance.

The four motor phase windings 22A, 22B, 22C, and 22D are connected to respective electronic phase switches 23A, 23B, 23C, and 23D. In the illustrated embodiment, the electronic phase switches 23A, 23B, 23C, and 23D are embodied as field effect transistors, and the motor phase windings 22A, 22B, 22C, and 22D are connected to the drain terminals thereof. The motor phase windings 22A, 22B, 22C, and 22D are also connected to respective anodes of diodes 24A, 24B, 24C, and 24D. The cathodes of the diodes 24A, 24B, 24C, and 24D are all connected together to one side of a capacitor 25. The other side of the capacitor 25 is connected to ground potential. The source terminals of the electronic phase switches 23A, 23B, 23C, and 23D are connected together at one side of a conventional current sensing device 26. The other side of the current sensing device 26 is connected to ground potential.

The gate terminals of the electronic phase switches 23A, 23B, 23C, and 23D are connected to a conventional current/commutation controller 27. The current/commutation controller 27 may be embodied as a logic circuit which generates electrical signals over lines 27A, 27B, 27C, and 27D to the gate terminals of the electronic phase switches 23A, 23B, 23C, and 23D. The current/commutation controller 27 is connected to the source of electrical energy 21 and to the current sensing device 26. Also, the current/commutation controller 27 may be connected to an external control line 28, for a purpose which will be explained below.

In a manner which is well known in the art, the current/commutation controller 27 generates electrical signals to the gate terminals of the electronic phase switches 23A, 23B, 23C, and 23D, causing them to open and close individually according to a predetermined sequence. When the electronic phase switches 23A, 23B, 23C, and 23D are closed, closed circuits are sequentially established with the source of electrical energy 21. As a result, electrical current flows from the source of electrical energy 21 sequentially through each of the associated motor phase windings 22A, 22B, 22C, and 22D, through the current sensing device 26, to ground potential. Consequently, the illustrated variable reluctance motor 10 is operated as described above.

The sequence and timing of the signals generated by the current/commutation controller 27 (and, therefore, of the pulses of electrical current fed to the individual phase windings of the motor 10) can be controlled in any known manner. For example, the current/commutation controller 27 can be operated on a pulse width modulated basis to control the operation of the illustrated variable reluctance motor 10. The feedback signal generated by the current sensing device 26 can be used by the current/commutation controller 27 to precisely determine the timing of the beginnings and endings of the pulses of electrical current. Similarly, an external signal (such as a rotor position signal, for example) generated over the external control line 28 can be used by the current/commutation controller 27 to adjust the sequence and timing of the signals generated thereby.

As mentioned above, when any one of the electronic phase switches (23A, for example) is closed, electrical current flows from the source of electrical energy 21 through the associated motor phase windings 22A. The motor phase winding 22A has an inductive component which creates a magnetic field and stores magnetic energy therein when electrical current is passed therethrough. Subsequently, when the electronic phase switch 23A is opened, the magnetic energy stored in the motor phase winding 22A develops a voltage which tends to maintain the flow of electrical current therethrough in the same direction. Absent some means for draining this voltage from the motor phase winding 22A, the electronic phase switch 23A would soon be damaged by the accumulated excessive voltage.

To prevent this from occurring, each of the motor phase windings 22A, 22B, 22C, and 22D is connected through a respective diode 24A, 24B, 24C, and 24D to the capacitor 25. When the electronic phase switch 23A is opened, the voltage developed by the motor phase winding 22A forward biases the diode 24A into a conductive mode. As a result, electrical current flows from the motor phase winding 22A through the diode 24A to the capacitor 25. Consequently, the capacitor 25 limits the rate of rise and the magnitude of the voltage developed by the motor phase winding 22A, thereby protecting the electronic phase switch 23A from damage. The voltages developed in the other motor phase windings 22B, 22C, and 22D are similarly drained into the capacitor 25 by means of the respective diodes 24B, 24C, and 24D. The structure of the actuator driver circuit 20 thus far described is conventional in the art.

In the past, a typical actuator driver circuit included a resistor connected between the cathodes of the diodes 24A, 24B, 24C, and 24D and the positive terminal of the source of electrical energy 21. The purpose of this resistor was to bleed off electrical energy stored in the capacitor 25 to the source of electrical energy 21, thereby preventing the accumulation of excess voltage across the capacitor 25. This approach was inefficient, inasmuch as much of the electrical energy stored in the capacitor 25 was lost. Also, the more or less continuous flow of electrical current through the resistor generated heat which lowered the reliability of the overall actuator driver circuit. Lastly, such current flow adversely affected the performance of the actuator driver circuit when the current/commutation controller 27 was operated at high frequencies.

The actuator driver circuit 20 of this invention includes a recovery circuit 30 for recovering the electrical energy stored in the capacitor 25 and for returning it to the source of electrical energy 21. As shown in FIG. 2, the junction of the diodes 24A, 24B, 24C, and 24D and the capacitor 25 is connected to the drain terminal of a recovery circuit switch 31. The source terminal of the recovery circuit switch 31 is connected to the cathode of a diode 32. The anode of the diode 32 is connected to ground potential. The drain terminal of the recovery circuit switch 31 is also connected to the anode of a diode 33. The cathode of the diode 33 is connected to the junction between a capacitor 34 and a resistor 35. The capacitor 34 is also connected to the cathode of the diode 32. The resistor 35 is connected to the cathode of a zener diode 36. The anode of the zener diode 36 is connected to the junction between the cathode of the diode 32 and a capacitor 37. The capacitor 37 is connected to the resistor 35 in parallel with the zener diode 36.

The source terminal of the recovery circuit switch 31 is also connected to one end of an inductor 38. The other end of the inductor 38 is connected to the positive terminal of the source of electrical energy 21. The purpose of this inductor 38 will be explained below. The drain terminal of the recovery circuit switch 31 is also connected to the cathode of a diode 39. The purpose of this diode 39 will also be explained below.

The gate terminal of the recovery circuit switch 31 is connected to a conventional duty cycle controller circuit 40. The duty cycle controller 40 may be embodied as a logic circuit which generates electrical signals over a line 40A to the gate terminal of the recovery circuit switch 31, causing it to open and close according to a predetermined sequence. When the recovery circuit switch 31 is closed, electrical current flows from the capacitor 25 to the inductor 38. When the recovery circuit switch 31 is opened, no electrical current can flow from the capacitor 25 to the inductor 38.

In operation, the recovery circuit switch 31, the inductor 38, and the duty cycle controller 40 function as an active recovery circuit for returning the unused energy stored in the capacitor 25 to the source of electrical energy 21. When the recovery circuit switch 31 is closed by the signal from the duty cycle controller 40, the difference between the voltage across the capacitor 25 and the voltage of the source of electrical energy 21 is applied across the inductor 38. This voltage differential causes electrical current to flow from the capacitor 25 through the inductor 38 to the source of electrical energy 21. When the recovery circuit switch 31 is opened, the magnetic energy stored in the inductor 38 maintains the flow of electrical current from the inductor 38 to the source of electrical energy 21. This continues until the magnetic energy stored in the inductor 38 reaches zero or until the recovery circuit switch 31 is subsequently re-closed. The diode 32 prevents the electrical current from the capacitor 25 from flowing to ground potential. Thus, the unused energy stored in the capacitor 25 is returned to the source of electrical energy 21.

Thus, in summary, the unused energy stored in the motor phase windings 22A, 22B, 22C, and 22D is sequentially drained into the capacitor 25. Then, the recovery circuit 30 periodically transfers a portion this energy from the capacitor 25 to the inductor 38. The inductor 38 then returns this energy to the source of electrical energy 21. The duty cycle time of the recovery circuit switch 31 (i.e., the ratio of the length of time which the switch 31 is closed to the length of time which the switch 31 is opened) is controlled by the duty cycle controller 40 to maintain the switch 31 closed for a sufficient period of time such that the accumulated voltage across the capacitor 25 does not exceed a predetermined value. Also, the frequency of the signals generated by the duty cycle controller 40 should preferably be greater than the frequency of the signals generated by the current/commutation controller 27.

The other components of the recovery circuit 30, namely, the diode 32, the diode 33, the capacitor 34, the resistor 35, the zener diode 36, and the capacitor 37, function as a self contained power supply for the duty cycle controller 40. The ground node (negative power terminal) of the duty cycle controller 40 is connected to the junction between the diode 32 and the inductor 38. Because of the presence of the diode 32, the voltage at this junction can vary from ground potential for the source of electrical energy 21 (and, in fact, does vary as the electrical energy from the capacitor 25 is transferred to the inductor 38 as described above).

The power node (positive power terminal) of the duty cycle controller 40 is connected to the cathode of the zener diode 36. The voltage at that junction is derived from the voltage across the capacitor 34. As discussed above, the capacitor 34 is also connected to the ground node (negative power terminal) of the duty cycle controller 40. Thus, the average voltage across the capacitor 34 is essentially equal to the difference between the voltage across the capacitor 25 and the voltage of the source of electrical energy 21. The diode 33 prevents this capacitor 34 from discharging when the recovery circuit switch 31 is closed. The resistor 35 and the zener diode 36 function to establish an upper voltage limit for this capacitor 34, while the capacitor 37 functions to smooth any changes in such voltage.

This self contained power supply derives its operating voltage from the unused energy stored in the windings 22A, 22B, 22C, and 22D of the actuator driver circuit 20. The ground node (negative power terminal) for the logic components of the duty cycle controller 40 and for the recovery switch 31 is at a potential which can switch relative to the ground node (negative power terminal) of the source of electrical energy 21. Thus, the power supply for the duty cycle controller 40 and for the recovery switch 31 does not directly derive its operating power from the source of electrical energy 21, nor does it incorporate the ground node (negative power terminal) of the source of electrical energy 21. This is advantageous because it reduces the amount of high frequency switching electrical noise which the recovery circuit would otherwise couple to the logic components of the duty cycle controller 40 and other systems which are operated by the source of electrical energy 21. Also, the illustrated structure provides a less expensive means for supplying power to the duty cycle controller 40. Thus, it can be seen that the actuator driver circuit 20 of this invention uses simple and inexpensive components to provide a self contained power supply for the logic components of the duty cycle controller 40 which is at least partially isolated from the source of electrical energy 21 and from the current/commutation controller 27.

Many applications for the actuator driver circuit 20 described above require operation from DC battery power, as opposed to rectified AC power. Such applications include electric motors for battery powered vehicles, such as golf carts and the like. In such applications, an external battery charging apparatus (not shown) is required to maintain the battery charged over long periods of time. An important aspect of the actuator driver circuit 20 of this invention is that the recovery circuit 30 can accept power from an external power source to re-charge the source of electrical energy 21. In doing so, the recovery circuit 30 can function as a battery charger and as an isolated power supply for the duty cycle controller 40, either while it is or is not operating.

To accomplish this, a pair of auxiliary power source terminals 41 and 42 are provided in the recovery circuit 30. The positive auxiliary power source terminal 41 is connected to the anode of the diode 39. As mentioned above, the cathode of the diode 39 is connected to the junction between the capacitor 25, the drain terminal of the recovery circuit switch 31, and the anode of the diode 33. The diode 39 functions to rectify the AC power supplied to the positive auxiliary power source terminal 41 and charge the capacitor 25. The diode 39 may be replaced by a conventional full wave rectifier if desired. The negative auxiliary power source terminal 42 is connected to the cathode of the diode 32 and to the ground potential for the actuator driver circuit 20. When used in this mode, the recovery circuit 30 functions as described above to re-charge the source of electrical energy 21, even though none of the motor phase windings 22A, 22B, 22C, or 22D are energized.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driver circuit for an electric actuator having at least one inductive winding of an electrical conductor comprising:
   a source of electrical energy;
   means for providing a closed circuit between said source of electrical energy and the winding such that electrical current flows through the winding, magnetic energy being stored in the winding when said electrical current flows therethrough;
   a recovery circuit for transferring at least some of the magnetic energy stored in the winding to said source of electrical energy, said recovery circuit including means for storing electrical energy, means for transferring at least some of the magnetic energy stored in the winding to said means for storing electrical energy, and an inductor connected between said means for storing electrical energy and said source of electrical energy; and
   power supply means for supplying electrical energy to said recovery circuit, said power supply means deriving the electrical energy supplied to said recovery circuit from the magnetic energy stored in the winding.

2. The driver circuit defined in claim 1 wherein said means for storing electrical energy is a capacitor.

3. The driver circuit defined in claim 1 wherein said recovery circuit further includes means for connecting said means for storing electrical energy to said inductor.

4. The driver circuit defined in claim 3 wherein said means for connecting includes a recovery switch connected between said means for storing electrical energy and said inductor and means for selectively opening and closing said recovery switch.

5. The driver circuit defined in claim 4 wherein said recovery switch is an electronic switch responsive to control signals for selectively being operated in an opened mode, wherein said means for storing electrical energy is not connected to said inductor, and in a closed mode, wherein said means for storing electrical energy is connected to said inductor.

6. The driver circuit defined in claim 5 wherein said means for selectively opening and closing said recovery switch includes a duty cycle controller for generating said control signals.

7. The driver circuit defined in claim 6 wherein said power supply means supplies power to said duty cycle controller.

8. The driver circuit defined in claim 7 wherein said power supply means includes a diode having an anode connected to said means for storing electrical energy and a cathode, a second means for storing electrical energy connected between said cathode of said diode and a first power terminal of said duty cycle controller, and a resistor connected between said cathode of said diode and a second power terminal of said duty cycle controller.

9. The driver circuit defined in claim 8 wherein said second means for storing electrical energy is a second capacitor.

10. The driver circuit defined in claim 8 wherein said power supply means further includes a zener diode having an anode connected to said first power terminal of said duty cycle controller and a cathode connected to said second power terminal of said duty cycle controller.

11. The driver circuit defined in claim 10 wherein said power supply means further includes a third means for storing electrical energy connected between said anode of said zener diode and said second power terminal of said duty cycle controller.

12. The driver circuit defined in claim 11 wherein said third means for storing electrical energy is a third capacitor.

13. The driver circuit defined in claim 1 further including means for connecting an external source of electrical energy to said recovery circuit for transferring electrical energy from the external source of electrical energy to said source of electrical energy.

14. The driver circuit defined in claim 13 wherein said means for connecting an external source of electrical energy includes a first external terminal and a first diode, said first diode having an anode connected to said first external terminal and a cathode connected to said recovery circuit.

15. The driver circuit defined in claim 14 wherein said means for connecting an external source of electrical energy further includes a second external terminal and a second diode, said second diode having an anode connected to said second external terminal and a cathode connected to said recovery circuit.

16. A driver circuit for an electric actuator having at least one inductive winding of an electrical conductor comprising:
   a source of electrical energy;
   means for providing a closed circuit between said source of electrical energy and the winding such that electrical current flows through the winding, magnetic energy being stored in the winding when said electrical current flows therethrough;

a recovery circuit for transferring at least some of the magnetic energy stored in the winding to said source of electrical energy, said recovery circuit including means for storing electrical energy, means for transferring at least some of the magnetic energy stored in the winding to said means for storing electrical energy, and means connected between said means for storing electrical energy and said source of electrical energy for transferring at least some of the electrical energy stored in said means for storing electrical energy to said source of electrical energy; and power supply means for supplying electrical energy to said recovery circuit, said power supply means including a diode having an anode connected to said means for storing electrical energy and a cathode, a second means for storing electrical energy connected between said cathode of said diode and said recovery circuit, and a resistor connected between said cathode of said diode and said recovery circuit.

17. The driver circuit defined in claim 16 wherein said power supply means further includes a zener diode having an anode connected to a first power terminal of a duty cycle controller and a cathode connected to a second power terminal of said duty cycle controller.

18. The driver circuit defined in claim 17 wherein said power supply means further includes a third means for storing electrical energy connected between said anode of said zener diode and said second power terminal of said duty cycle controller.

19. The driver circuit defined in claim 16 wherein said means connected between said means for storing electrical energy and said source of electrical energy includes an inductor connected between said means for storing electrical energy and said source of electrical energy.

20. The driver circuit defined in claim 16 wherein said means connected between said means for storing electrical energy and said source of electrical energy includes a recovery switch connected between said means for storing electrical energy and said source of electrical energy.

21. The driver circuit defined in claim 20 further including means for selectively opening and closing said recovery switch.

22. The driver circuit defined in claim 21 wherein said recovery switch is an electronic switch responsive to control signals for selectively being operated in an opened mode, wherein said means for storing electrical energy is not connected to said source of electrical energy, and in a closed mode, wherein said means for storing electrical energy is connected to said source of electrical energy.

23. The driver circuit defined in claim 22 wherein said means for selectively opening and closing said recovery switch includes a duty cycle controller for generating said control signals.

24. The driver circuit defined in claim 23 wherein said power supply means supplies power to said duty cycle controller.

25. A driver circuit for an electric actuator having at least one inductive winding of an electrical conductor comprising:

a source of electrical energy;

means for providing a closed circuit between said source of electrical energy and the winding such that electrical current flows through the winding, magnetic energy being stored in the winding when said electrical current flows therethrough;

a recovery circuit for transferring at least some of the magnetic energy stored in the winding to said source of electrical energy;

power supply means for supplying electrical energy to said recovery circuit, said power supply means deriving the electrical energy supplied to said recovery circuit from the magnetic energy stored in the winding; and means for connecting an external source of electrical energy to said recovery circuit for transferring electrical energy from the external source of electrical energy to said source of electrical energy.

26. The driver circuit defined in claim 25 wherein said means for connecting an external source of electrical energy includes a first external terminal and a first diode, said first diode having an anode connected to said first external terminal and a cathode connected to said recovery circuit.

27. The driver circuit defined in claim 26 wherein said means for connecting an external source of electrical energy further includes a second external terminal and a second diode, said second diode having an anode connected to said second external terminal and a cathode connected to said recovery circuit means.

28. A driver circuit for an electric actuator having at least one inductive winding of an electrical conductor comprising:

a source of electrical energy including a common power terminal;

means for providing a closed circuit between said source of electrical energy and the winding such that electrical current flows through the winding, magnetic energy being stored in the winding when said electrical current flows therethrough;

a recovery circuit for transferring at least some of the magnetic energy stored in the winding to said source of electrical energy, said recovery circuit including a common power terminal which is connected to said common power terminal of said source of electrical energy by a diode;

power supply means for supplying electrical energy to said recovery circuit, said power supply means deriving the electrical energy supplied to said recovery circuit from the magnetic energy stored in the winding.

* * * * *